G. W. RICKARD & E. C. DE VOE.
TROLLEY HARP.
APPLICATION FILED MAR. 22, 1912.
1,051,009.
Patented Jan. 21, 1913.
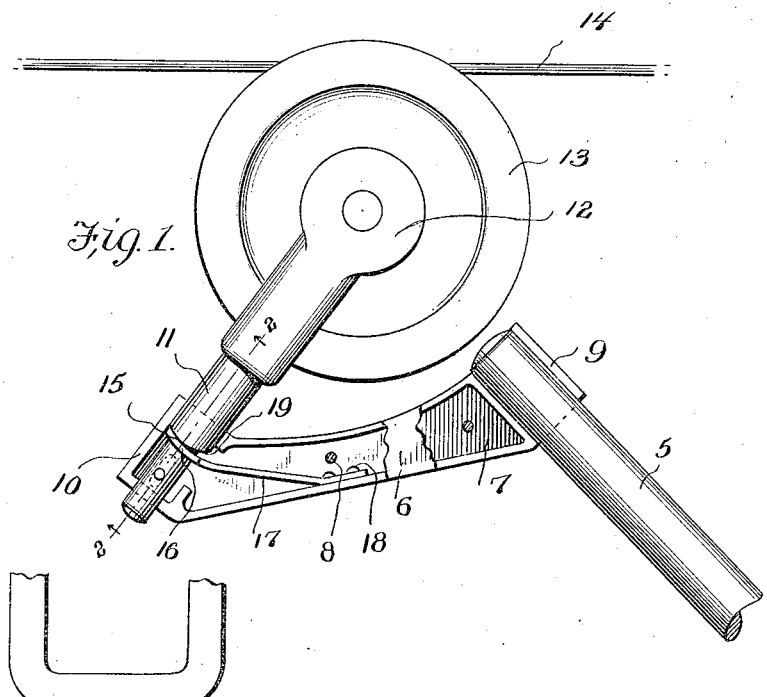
Fig. 1.
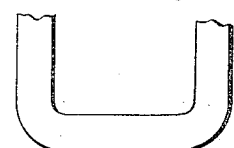
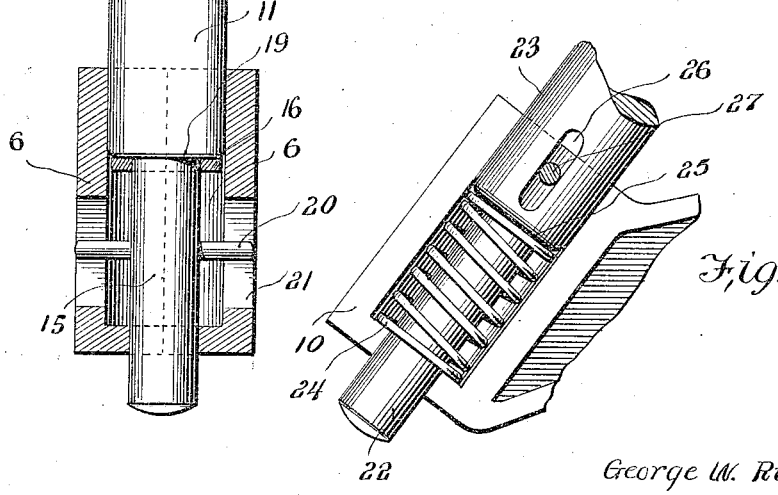
Fig. 2.
Fig. 3.
Witnesses
William R. Smith
F. Q. Parker
Inventors
George W. Rickard.
Earl C. DeVoe.
By Victor J. Evans
Attorney
COLUMBIA PLANOGRAPH CO., WASHINGTON, D. C.

UNITED STATES PATENT OFFICE.

GEORGE W. RICKARD AND EARL C. DE VOE, OF DAYTON, OHIO.

TROLLEY-HARP.

1,051,009.  Specification of Letters Patent.  Patented Jan. 21, 1913.

Application filed March 22, 1912. Serial No. 685,429.

*To all whom it may concern:*

Be it known that we, GEORGE W. RICKARD and EARL C. DE VOE, citizens of the United States, residing at Dayton, in the county of Montgomery and State of Ohio, have invented new and useful Improvements in Trolley-Harps, of which the following is a specification.

The invention relates to trolley harps and more particularly to the class of cushion trolley harps.

The primary object of the invention is the provision of a harp in which the fork supporting the trolley wheel will be slidably supported and held resiliently so as to yield thus assuring positive contact with the wheel when traveling over or following irregularities in the trolley wire.

Another object of the invention is the provision of a trolley harp in which the supporting fork for the trolley wheel will be limited in its displacement, yet the same will be yieldingly held to assure positive engagement of the trolley wheel with the current or trolley wire.

A further object of the invention is the provision of a trolley harp which is simple in construction, strong, reliable and efficient in purpose, and inexpensive in manufacture.

With these and other objects in view the invention consists in the construction, combination and arrangement of parts as will be hereinafter more fully described, illustrated in the accompanying drawings and pointed out in the claim hereunto appended.

In the drawings:—Figure 1 is a side elevation of a harp constructed in accordance with the invention, one plate of the harp being partly broken away. Fig. 2 is a sectional view on the line 2—2 looking in the direction of the arrow. Fig. 3 is a fragmentary side elevation of a slight modification of harp showing one side plate thereof removed.

Similar reference characters indicate corresponding parts throughout the several views in the drawing.

Referring to the drawings by numerals 5 designates a portion of a trolley pole of the ordinary well-known construction and on which is adapted to be mounted at an angle the trolley harp presently described.

The trolley harp comprises a pair of complementary shaped arm sections 6 forming the arm of the said harp each section being provided at its inner face with a hollow forming a recess 7 which extends substantially the length thereof thereby minimizing the weight of the arm. The sections 6 are joined by means of transverse rivets or bolts 8. Formed at one end of the arm is a sleeve 9 which is of the split type by reason of the arm being formed from the two sections 6 and is adapted to receive the upper end of the trolley pole 5 for the fastening of the arm thereon. Formed on the other end of the arm is a barrel 10 in which is fitted for sliding movement the stem 11 of a fork 12 in which is journaled the trolley wheel 13 engageable with the trolley wire 14, the wheel 13 being of the ordinary well-known construction. The stem 11 of the fork 12 is formed with a reduced free end 15, which has straddling it the bifurcated end 16 of a flat leaf spring 17 secured at 18 to the arm within the hollows of the section 6 thereof. The spring 17 at its bifurcated end 16 is slightly concave to engage convex bearing shoulders 19 on the stem 11 and is designed to yieldingly hold the fork 12 thereby assuring the contact of the wheel 13 with the trolley wire 14 when following the same. Thus, in this manner, the trolley wheel 13 will be prevented from jumping the wire 14 when running over irregularities therein.

Mounted in the reduced end 15 of the stem 11 of the fork is a transverse pin forming laterally extending opposite stop lugs 20 which engage and are adapted to work in elongated slots 21 formed in the opposed walls of the barrel 10 and in this manner the stem 11 will be limited in its displacement in the arm of the harp.

In Fig. 3 there is shown a slight modification of the invention wherein the reduced end 22 of the stem 23 of the fork is surrounded by a coiled expansion spring 24 which is confined within the barrel 10 and has one of its ends bearing against the shoulder 25 of the stem 23 and the lower closed end of the said barrel so as to act upon the stem for permitting yielding movement thereof. Formed in the stem 23 is an elongated slot 26 through which is passed a pin 27 fixed in the walls of the barrel so as to limit the yielding movement of the stem therein. The barrel and slot formed at opposite ends of the arm of the harp are disposed in upwardly converging relation to each other so that the stem supporting the trolley wheel will be at right angles to the axis of the trolley pole.

What is claimed is:—

The combination with a pole, of a trolley harp comprising a bracket having sleeve terminals at right angles to each other and also provided with a chamber therebetween communicating with one of said sleeves, a forked stem having a reduced end loosely engaged in the sleeve communicating with the chamber, a shoulder formed on the reduced end of said stem, a leaf spring disposed within said chamber and having one end fixed therein and also having an opposite forked end loosely engaging the said shoulder on the stem, and a trolley wheel journaled in the fork of the same.

In testimony whereof we affix our signatures in presence of two witnesses.

GEO. W. RICKARD.
EARL C. DE VOE.

Witnesses:
ALFRED S. FRANK,
WELLMORE B. TURNER.

Copies of this patent may be obtained for five cents each, by addressing the "Commissioner of Patents, Washington, D. C."